United States Patent
Olson et al.

[19]

[11] Patent Number: 6,135,491
[45] Date of Patent: Oct. 24, 2000

[54] ROOF HEADLINING WITH INTEGRATED HEAD GUARD GAS BAG MODULES

[75] Inventors: Mark Olson, Eschach; Michael Stütz, Spraitbach; Heinz Eyrainer, Waldstetten, all of Germany

[73] Assignee: TRW Occupant Restraint Systems GmbH & Co. KG, Alfdorf, Germany

[21] Appl. No.: 09/152,942

[22] Filed: Sep. 14, 1998

[30] Foreign Application Priority Data

Sep. 15, 1997 [DE] Germany ............. 297 16 574 U

[51] Int. Cl.[7] ............................................. B60R 21/22
[52] U.S. Cl. ................................. 280/730.2; 296/214
[58] Field of Search .................. 296/214; 280/730.1, 280/730.2, 728.1

[56] References Cited

U.S. PATENT DOCUMENTS

| | | | |
|---|---|---|---|
| 3,774,936 | 11/1973 | Barnett et al. . | |
| 5,265,903 | 11/1993 | Kuretake et al. | 280/730 |
| 5,322,322 | 6/1994 | Bark et al. | 280/730.2 |
| 5,362,097 | 11/1994 | Barske | 280/730.1 |
| 5,470,103 | 11/1995 | Vaillancourt et al. | 280/730.1 |
| 5,540,459 | 7/1996 | Daniel | 280/730.2 |
| 5,602,734 | 2/1997 | Kithil | 280/730.1 X |
| 5,755,457 | 5/1998 | Specht | 280/730.2 X |
| 5,775,726 | 7/1998 | Timothy et al. | 280/730.2 |
| 5,788,270 | 8/1998 | HAland et al. | 280/730.2 X |
| 5,791,683 | 8/1998 | Shibata et al. | 280/730.2 |
| 5,823,568 | 10/1998 | Wittmann et al. | 280/728.1 X |
| 5,855,408 | 1/1999 | Rickabus | 296/214 |
| 5,884,937 | 3/1999 | Yamada | 280/730.2 |
| 5,988,735 | 11/1999 | Muller | 296/214 |

FOREIGN PATENT DOCUMENTS

| | | | |
|---|---|---|---|
| 0694444A2 | 1/1996 | European Pat. Off. | 280/728.2 |
| 1392677 | 2/1965 | France | 280/730.1 |
| 296 03 316 U | 8/1996 | Germany . | |
| 196 32 222 | 2/1998 | Germany . | |
| 2261636 | 5/1993 | United Kingdom . | |

OTHER PUBLICATIONS

Patent Abstracts of Japan No. 08310335, Nov. 26, 1996.

*Primary Examiner*—Peter English
*Attorney, Agent, or Firm*—Tarolli, Sundheim, Covell, Tummino & Szabo L.L.P.

[57] ABSTRACT

A vehicular roof headlining includes an integrated head protection restraining apparatus in the form of several inflatable gas bags which are stowed folded in a trough-shaped receiving body 18 in the border region of the headlining and form, together with the headlining, a preassembled module.

3 Claims, 2 Drawing Sheets

ROOF HEADLINING WITH INTEGRATED HEAD GUARD GAS BAG MODULES

FIELD OF THE INVENTION

The invention relates to a vehicular roof headlining.

BACKGROUND OF THE INVENTION

For the head protection of vehicle occupants, in the case of a vehicle side impact or turnover, inflatable gas bags are employed which in the normal resting position are stowed folded in a slim receiving housing. The receiving housing along with the gas bag stowed therein and an inflator for inflating the gas bag form a module which prior to fitting the roof headlining to the body of the vehicle is arranged on and secured to the border region between roof and vehicle doors.

SUMMARY OF THE INVENTION

The invention provides a vehicular roof headlining which together with an integrated head guard restraining means in the form of several inflatable gas bags forms a preassembled module ready for installation. The special features of this roof headlining are set forth in the claims.

BRIEF DESCRIPTION OF THE DRAWINGS

Preferred embodiments of the invention will now be described in more detail with respect to the attached drawings, in which.

DESCRIPTION OF THE PREFERRED EMBODIMENTS

Figure 1:
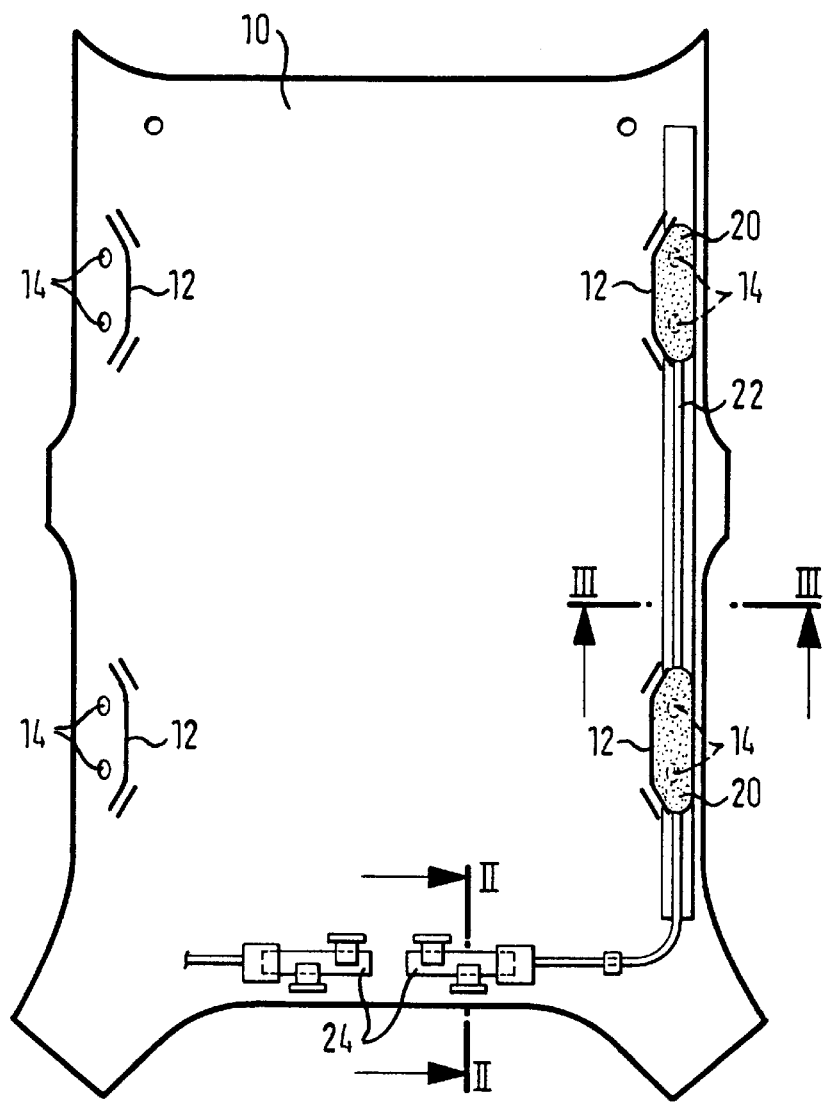
FIG. 1 is a schematic plan view of a vehicular roof headlining.
Figure 2:
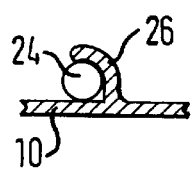
FIG. 2 is a section along the line II—II as shown in FIG. 1.
Figure 3:
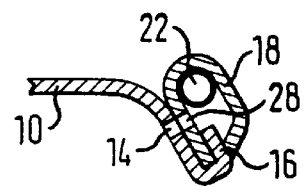
FIG. 3 is a section along the line III—III as shown in FIG. 1.

The integral roof headlining 10 is equipped with four depressions 12 each of which is designed to receive a grab handle. Provided in the bottom of each depression 12 are two through-holes 14 spaced away from each other, serving to secure a grab handle to the vehicle body and simultaneously to also secure the roof headlining 10 as a whole to the vehicle. The edges of the headlining 10 on the long sides are integrally provided with an upswept lip 16 forming an elongated groove. Engaging this groove is one leg of an elongated, trough-shaped receiving body 18. Stowed in this receiving body 18 are two folded gas bags 20 having a common gas conduct tube 22. Each gas conduct tube 22 is connected to an assigned inflator 24 which is secured by two clips 26 under the rear edge of the headlining 10 and is thus likewise integrated in the headlining. As evident from FIG. 3 the trough-shaped receiving body 18 comprises fastener openings 28 in line with the through-holes 14 in the bottom of the depressions 12. This arrangement makes it possible to define both the roof headlining 10 and the gas bag modules on the vehicle body by means of the bolts fastening the grab handles.

Figure 4:
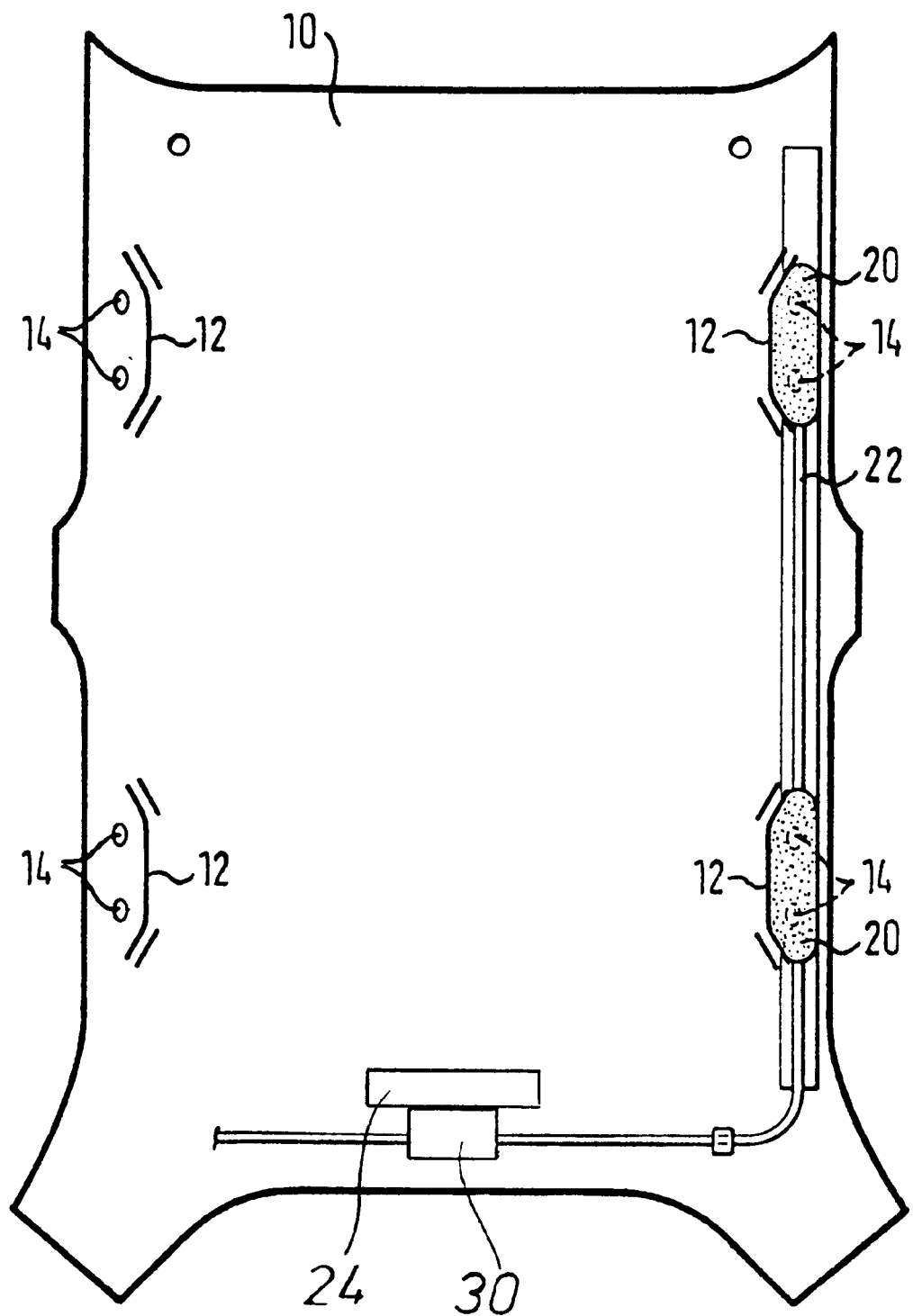
FIG. 4 is a schematic plan view of a vehicular roof headlining.

In a modified embodiment which is shown in FIG. 4, instead of two separate inflators 24 only one is used which can be switched over between the right and left-hand module by a valve assembly 30. Depending on the side on which an impact occurs, the valve assembly 30 is switched so that the inflator 24 acts either upon the right or the left gas bag module. The impact can be sensed by conventional sensors (not shown) and the valve assembly 30 can be controlled by conventional controlling devices (not shown).

What is claimed is:

1. A vehicular roof headlining, comprising a trough-shaped receiving body in a border region of the headlining and an integrated head protection restraining means, said integrated head protection restraining means comprising a plurality of inflatable gas bags, said headlining having long sides provided with a lip forming an elongated groove, said receiving body engaging said groove of said headlining, said gas bags being stowed in a folded condition in a volume substantially defined by said trough-shaped receiving body, and said gas bags forming, together with the headlining, a preassembled module.

2. A vehicular roof headlining, comprising a trough-shaped receiving body in a border region of the headlining and an integrated head protection restraining means, said integrated head protection restraining means comprising a plurality of inflatable gas bags, said gas bags being stowed in a folded condition in said trough-shaped receiving body, said gas bags forming, together with the headlining, a preassembled module, each of said gas bags being arranged in the region of a depression for receiving a grab handle, said depressions comprising through-holes provided for fastening bolts for securing said grab handles, said receiving body comprising fastener openings aligned with said through-holes for fixing both said headlining and said preassembled module by said fastening bolts.

3. A vehicular roof headlining, comprising trough-shaped receiving bodies in a border region of the headlining and an integrated head protection restraining means, said integrated head protection restraining means comprising a common source of compressed gas provided with a valve assembly, and at least two inflatable gas bags, said gas bags being connected to said common source of compressed gas and being stowed in a folded condition in said trough-shaped receiving bodies, said gas bags forming, together with the headlining, a preassembled module, a first gas bag being disposed on a first long side of said headlining and a second gas bag being disposed on a second long side of said headlining, said valve assembly being switchable for selecting which one of said two gas bags is to be inflated by said gas source.

* * * * *